United States Patent
Bijoy et al.

(10) Patent No.: US 11,782,795 B2
(45) Date of Patent: Oct. 10, 2023

(54) SOURCE VERSUS TARGET METADATA-BASED DATA INTEGRITY CHECKING

(71) Applicant: EMC IP Holding Company LLC, Hopkinton, MA (US)

(72) Inventors: Savitha Susan Bijoy, Trivandrum (IN); Gururaj Kulkarni, Bangalore (IN); Mahesh Kamath, Bangalore (IN); Kiran Kumar Malle Gowda, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 99 days.

(21) Appl. No.: 17/384,975

(22) Filed: Jul. 26, 2021

(65) Prior Publication Data
US 2022/0398165 A1 Dec. 15, 2022

(30) Foreign Application Priority Data
Jun. 11, 2021 (IN) .............................. 202141026166

(51) Int. Cl.
*G06F 16/00* (2019.01)
*G06F 11/14* (2006.01)
*H04L 9/06* (2006.01)
*G06F 21/64* (2013.01)

(52) U.S. Cl.
CPC .......... *G06F 11/1458* (2013.01); *G06F 21/64* (2013.01); *H04L 9/0643* (2013.01); *G06F 2201/84* (2013.01)

(58) Field of Classification Search
CPC .. G06F 11/1458; G06F 21/64; G06F 2201/84; H04L 9/0643
USPC ......................................................... 707/654
See application file for complete search history.

(56) References Cited

U.S. PATENT DOCUMENTS

| | | | |
|---|---|---|---|
| 9,760,445 B1 * | 9/2017 | Chopra | G06F 3/0683 |
| 2007/0050777 A1 * | 3/2007 | Hutchinson | G06F 11/0781 |
| | | | 718/104 |
| 2009/0059915 A1 * | 3/2009 | Baker | H04L 67/61 |
| | | | 370/389 |

(Continued)

FOREIGN PATENT DOCUMENTS

CN 106936771 A * 7/2017 ......... H04L 63/0435

*Primary Examiner* — Monica M Pyo
(74) *Attorney, Agent, or Firm* — Chamberlain, Hrdlicka, White, Williams & Aughtry

(57) ABSTRACT

A method and system for source versus target metadata-based data integrity checking. Concerning backup operations directed to protecting given data, said given data may be subjected to corruption detection at the source prior to initiating a backup operation, however, said given data may not be checked for data integrity following transfer of said given data to a target storage medium prior to committing the said given data thereto. That is, at least presently, the prospect of data corruption compromising given data during the time window through which the given data journeys, usually via a network, from its source to a target storage medium, is often overlooked. The disclosed method and system, accordingly, propose a scheme directed to detecting corruption amongst data transferred from a source to a target storage medium, and handling said data given the determined integrity of said data.

20 Claims, 3 Drawing Sheets

(56) References Cited

U.S. PATENT DOCUMENTS

| | | | |
|---|---|---|---|
| 2010/0191907 A1* | 7/2010 | Ish | G06F 11/1096 |
| | | | 711/E12.001 |
| 2014/0188805 A1* | 7/2014 | Vijayan | G06F 16/113 |
| | | | 707/646 |
| 2016/0285872 A1* | 9/2016 | Polar | G06Q 50/06 |
| 2020/0293671 A1* | 9/2020 | Krause | G06F 11/2089 |

* cited by examiner

SOURCE VERSUS TARGET METADATA-BASED DATA INTEGRITY CHECKING

BACKGROUND

At least presently, the prospect of data corruption compromising given data during the time window through which the given data journeys, usually via a network, from its source to a target storage medium, is often overlooked.

SUMMARY

In general, in one aspect, the invention relates to a method for data protection. The method includes providing, to an asset source, instructions for initiating a backup operation targeting an asset on the asset source, receiving, from the asset source and in response to the instructions, source backup information pertinent to the asset, receiving, from a backup target, target backup information pertinent to an asset backup associated with the asset, making a determination that the source backup information matches the target backup information, and instructing, based on the determination, the backup target to commit the asset backup.

In general, in one aspect, the invention relates to a non-transitory computer readable medium (CRM). The non-transitory CRM includes computer readable program code, which when executed by a computer processor, enables the computer processor to perform a method for data protection. The method includes providing, to an asset source, instructions for initiating a backup operation targeting an asset on the asset source, receiving, from the asset source and in response to the instructions, source backup information pertinent to the asset, receiving, from a backup target, target backup information pertinent to an asset backup associated with the asset, making a determination that the source backup information matches the target backup information, and instructing, based on the determination, the backup target to commit the asset backup.

Other aspects of the invention will be apparent from the following description and the appended claims.

DETAILED DESCRIPTION

Figure 1:
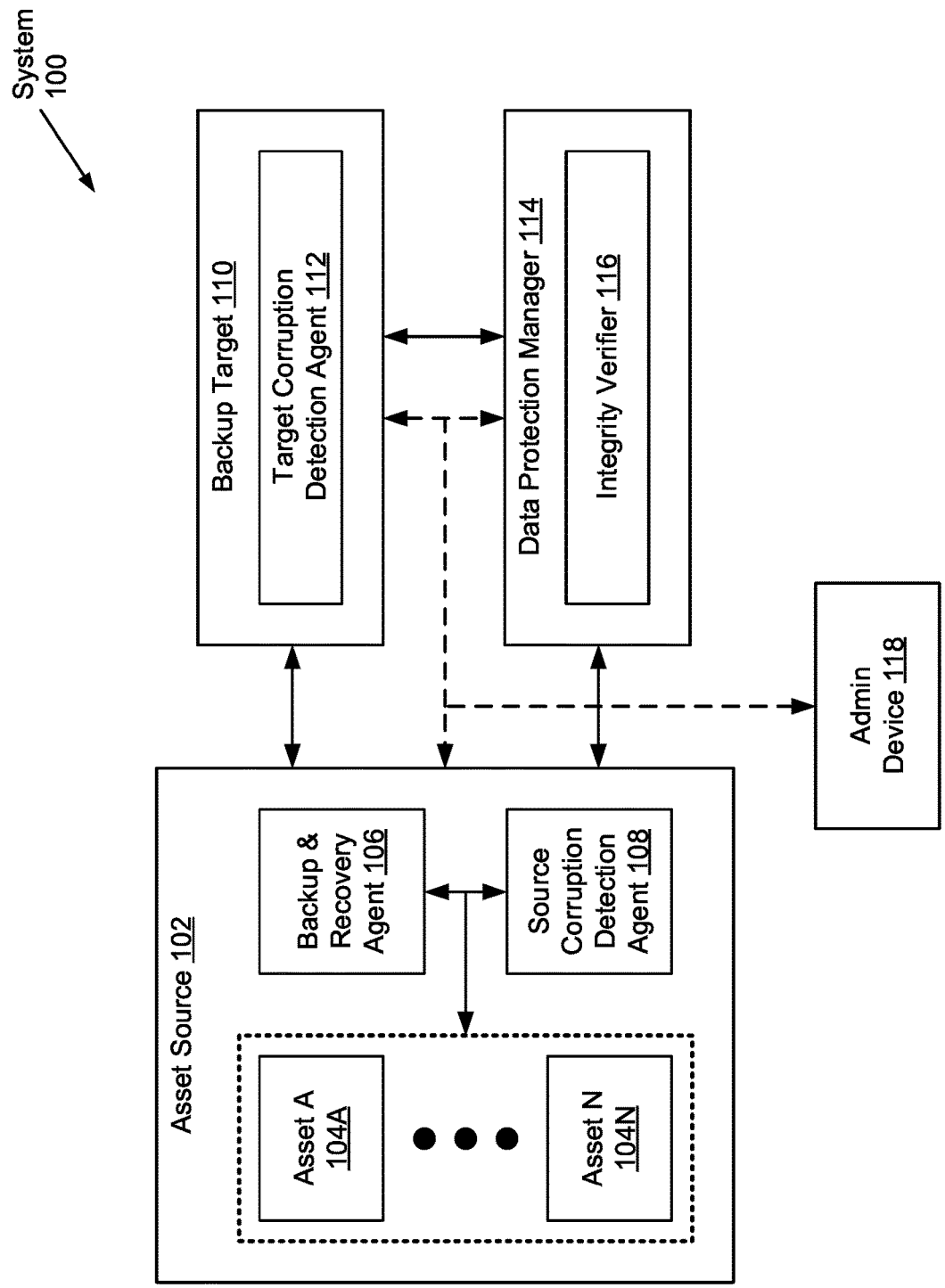
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for source versus target metadata-based data integrity checking. Concerning backup operations directed to protecting given data, said given data may be subjected to corruption detection at the source prior to initiating a backup operation, however, said given data may not be checked for data integrity following transfer of said given data to a target storage medium prior to committing the said given data thereto. That is, at least presently, the prospect of data corruption compromising given data during the time window through which the given data journeys, usually via a network, from its source to a target storage medium, is often overlooked. Embodiments of the invention, accordingly, propose a scheme directed to detecting corruption amongst data transferred from a source to a target storage medium, and handling said data given the determined integrity of said data.

FIG. 1 shows a system in accordance with one or more embodiments of the invention. The system (100) may include an asset source (102), a backup target (110), a data protection manager (114), and an admin device (118). Each of these system (100) components is described below.

In one embodiment of the invention, the asset source (102) may represent any physical appliance or computing system designed and configured to receive, generate, process, store, and/or transmit data, as well as to provide an environment in which one or more computer programs may execute thereon. The computer program(s) may, for example, implement large-scale and complex data processing; or implement one or more services offered locally or over a network. Further, in providing an execution environment for any computer program(s) installed thereon, the asset source (102) may include and allocate various resources (e.g., computer processors, memory, storage, virtualization, network bandwidth, etc.), as needed, to the computer program(s) and the workloads instantiated thereby. One of ordinary skill will appreciate that the asset source (102) may perform other functionalities without departing from the scope of the invention. Examples of the asset source (102) may include, but are not limited to, a desktop computer, a laptop computer, a server, a mainframe, or any other computing system similar to the exemplary computing system shown in FIG. 3. Moreover, the asset source (102) may include one or more assets (104A-104N), a backup and recovery agent (106), and a source corruption detection agent (108). Each of these asset source (102) subcomponents is described below.

In one embodiment of the invention, an asset (104A-104N) may refer to a database, or any logical container to and from data (and/or metadata thereof), which has been received by or generated on the asset source (102), may be stored and retrieved, respectively. An asset (104A-104N) may occupy any portion of persistent storage (not shown) available on the asset source (102). Examples of persistent storage may include, but are not limited to, optical storage, magnetic storage, NAND Flash Memory, NOR Flash Memory, Magnetic Random Access memory (M-RAM), Spin Torque Magnetic RAM (ST-MRAM), Phase Change Memory (PCM), or any other storage defined as non-volatile Storage Class memory (SCM).

In one embodiment of the invention, the backup and recovery agent (106) may refer to a computer program that may execute on the underlying hardware of the asset source (102), which may be responsible for facilitating backup and recovery operations targeting one or more assets (104A-104N) on the asset source (102). To that extent, the backup and recovery agent (106) may protect one or more assets (104A-104N) against data loss (i.e., backup the targeted data and/or metadata); and reconstruct one or more assets (104A-104N) following such data loss (i.e., recover the targeted data and/or metadata). Further, one of ordinary skill will appreciate that the backup and recovery agent (106) may perform other functionalities without departing from the scope of the invention.

In one embodiment of the invention, the source corruption detection agent (108) may refer to a computer program that may execute on the underlying hardware of the asset source (102), which may be responsible for metadata submission therefrom. More specifically, the source corruption detection agent (108) may include functionality to: upon receipt of instructions from the data protection manager (114) to initiate a backup operation at the asset source (102) for a given asset (104A-104N), obtain metadata (or a cryptographic hash thereof) descriptive of the data belonging to the given asset (104A-104N); and submit the obtained metadata (or the cryptographic hash thereof) to the data protection manager (114) prior to initiating the backup operation per the received instructions. One of ordinary skill, however, will appreciate that the source corruption detection agent (108) may perform other functionalities without departing from the scope of the invention.

In one embodiment of the invention, the backup target (110) may represent any data backup, archiving, and/or disaster recovery storage system. The backup target (110) may be implemented using one or more storage servers (or computing systems similar to the exemplary computing system shown in FIG. 3) (not shown)—each of which may house one or many storage devices for storing data. Further, the backup target (110) may, at least in part, include persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Moreover, the backup target (110) may include a target corruption detection agent (112), which is described below.

In one embodiment of the invention, the target corruption detection agent (112) may refer to a computer program that may execute on the underlying hardware of the backup target (110), which may be responsible for metadata submission therefrom. More specifically, the target corruption detection agent (112) may include functionality to: receive data belonging to a given asset (104A-104N) from the asset source (102) during a backup operation targeting the given asset (104A-104N); upon completing the transfer of the data from the asset source (102) to the backup target (110), notify the data protection manager (114) of the completion of said data transfer; receive a request thereafter, from the data protection manager (114), to provide metadata (or a cryptographic hash thereof) descriptive of the transferred data; obtaining the requested metadata (or the requested cryptographic hash thereof) for the transferred data; submitting, in response to the received request, the obtained metadata (or cryptographic hash thereof) to the data protection manager (114); and receiving, thereafter in return, instructions from the data protection manager (114) to either commit the transferred data into storage on the backup target (110) or discard the transferred data, based on the submitted metadata (or cryptographic hash thereof). One of ordinary skill, however, will appreciate that the target corruption detection agent (112) may perform other functionalities without departing from the scope of the invention.

In one embodiment of the invention, the data protection manager (114) may represent information technology (IT) infrastructure configured for data integrity check management. To that extent, the data protection manager (114) may include functionality to perform the method outlined and described through FIG. 2, below. One of ordinary skill, however, will appreciate that the data protection manager (114) may perform other functionalities without departing from the scope of the invention. Furthermore, the data protection manager (114) may include and employ an integrity verifier (116) to, at least in part, fulfill the aforementioned functionality, which is described below.

In one embodiment of the invention, the integrity verifier (116) may refer to a computer program that may execute on the underlying hardware of the data protection manager (114), which may be responsible for determining whether metadata (or a cryptographic hash thereof) submitted from the asset source (102), and metadata (or a cryptographic hash thereof) submitted from the backup target, (110) match or mismatch. As a result of the former, the integrity verifier (116) may deduce that the data being targeted for backup, a copy of which now transferred to the backup target (110), is corruption-free and, accordingly, may instruct the backup target (110) to commit the aforementioned copy of the data into storage. On the other hand, as a result of the latter, the integrity verifier (116) may alternatively deduce that the data being targeted for backup, a copy of which now transferred to the backup target (110), is corrupted and, accordingly, may alternatively instruct the backup target (110) to discard the aforementioned copy of the data it has obtained. One of ordinary skill will appreciate that the integrity verifier (116) may perform other functionalities without departing from the scope of the invention.

In one embodiment of the invention, the admin device (118) may represent any physical appliance or computing system operated by one or more administrators of the system (100). An administrator may refer to an individual or entity whom may be responsible for overseeing system (100) operations and maintenance. To that extent, and at least as it pertains to embodiments of the invention, the admin device (118) may include functionality to enable an administrator to: register the asset source (102) with the data protection manager (114); and submit protection policies, concerning one or more assets (described below) on the asset source (102), to the data protection manager (114). These functionalities are described in further detail in FIG. 2, below. Further, one of ordinary skill will appreciate that the admin device (118) may perform other functionalities without departing from the scope of the invention.

In one embodiment of the invention, the above-mentioned system (100) components (or subcomponents thereof) may communicate with one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1 shows a configuration of components, other system (100) configurations may be used without departing from the scope of the invention. For example, the system (100) may include more than one asset source (not shown) and/or more than one backup target (not shown).

Figure 2:
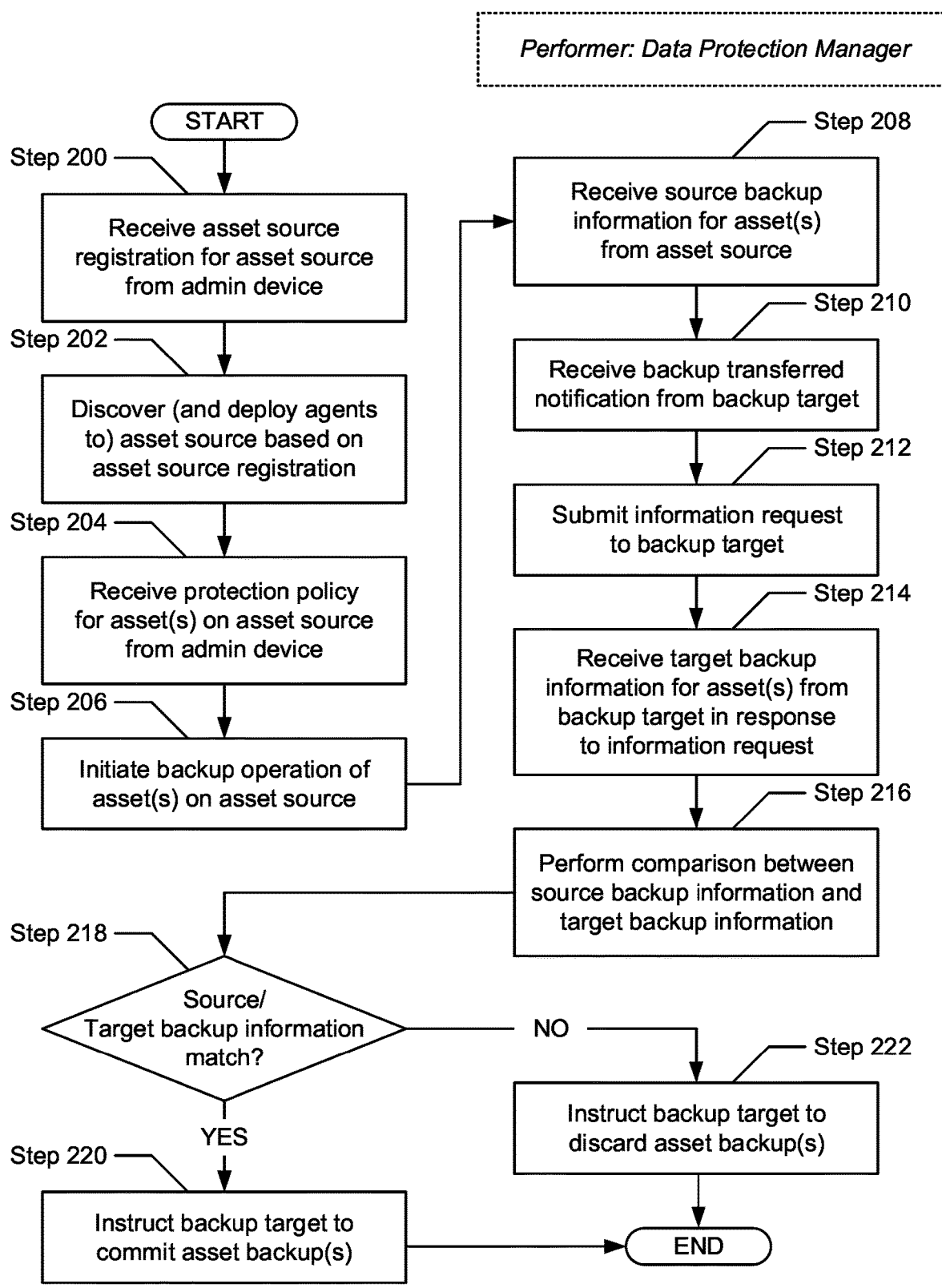
FIG. 2 shows a flowchart describing a method for source versus target metadata-based data integrity checking in accordance with one or more embodiments of the invention.

FIG. 2 shows a flowchart describing a method for source versus target metadata-based data integrity checking in accordance with one or more embodiments of the invention. The various steps outlined below may be performed by the data protection manager (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, an asset source registration, for an asset source (see e.g., FIG. 1), is received from an admin device. In one embodiment of the invention, the asset source registration may refer to connection information for the asset source. Connection information may entail information necessary to connect to and/or interact with the asset source, which may include, but is not limited to: an Internet Protocol (IP) address assigned to the asset source; a network port number of the asset source through which a connection thereto may be attempted; and authentication information (e.g., authentication mode, username or login, and password) for accessing the asset source.

In Step 202, based on the asset source registration (received in Step 200), the asset source is discovered and agents are deployed thereto. In one embodiment of the invention, discovering the asset source may entail establishing a connection with and successfully accessing the asset source using the provided connection information. Further, agents deployed to and/or installed on the asset source may include, but are not limited to, a backup and recovery agent and a source corruption detection agent (both described above) (see e.g., FIG. 1).

In Step 204, a protection policy, for one or more assets (described above) (see e.g., FIG. 1) on the asset source, is received from the admin device. In one embodiment of the invention, the protection policy may refer to a collection of rules and/or preferences directed to the protection of asset data and/or metadata. The rules and/or preferences specified in/by the protection policy may include, but are not limited to: which asset data and/or metadata is/are critical regarding data protection; which modes of backup operations (e.g., incremental, full, etc.) should be performed that target the asset data and/or metadata, and how often (or on what schedule) should the backup operations occur; which backup target or storage medium should asset backup(s) be committed to; what is the retention span or recovery point objective (RPO) assigned to the asset data and/or metadata; whether data integrity verification, in accordance with embodiments of the invention, should be applied while performing backup operations targeting the asset data and/or metadata; and in which information mode (described below) should the aforementioned data integrity verification be performed.

In Step 206, based on the protection policy (received in Step 204), the backup and recovery agent (deployed to the asset source in Step 202) is instructed to initiate a backup operation targeting the asset(s) (or more specifically, certain data and/or metadata therein) with which the protection policy is associated. The instructions may specify performing a data integrity verification of the asset data and/or metadata and, accordingly, may further specify an information mode, where the information mode references a format of a predefined collection of metadata required to perform the data integrity verification. In one embodiment of the invention, the information mode may reference a non-hash mode, where a predefined collection of metadata, descriptive of the asset data, may be sought to perform the data integrity verification. In another embodiment of the invention, the information mode may reference a hash mode, where, alternatively, a cryptographic hash of the aforementioned, predefined collection of metadata, descriptive of the asset data, may instead be sought to perform the data integrity verification. Further, in yet another embodiment of the invention, the information mode may reference a combination mode, where: (a) a hash-mode based data integrity verification may be performed first; and (b) upon a successful result of (a), then a non-hash mode based data integrity verification may be performed second.

In one embodiment of the invention, for a given asset data of one or more assets being targeted for data protection through a backup operation, the predefined collection of metadata, descriptive of the given asset data, may include, but is not limited to: a data type of the given asset data; a creation timestamp generated for the given asset data; a last modification timestamp generated for the given asset data; permission and/or ownership information associated with the given asset data; a format or extension of the given asset data; a size (e.g., in bytes) of the given asset data; and a checksum associated with the given asset data.

Further, in one embodiment of the invention, a cryptographic hash of a given information set (e.g., the above-mentioned predefined collection of metadata descriptive of a given asset data) may refer to a hash value or output that results when the given information set is fed through a cryptographic hash function. A cryptographic hash function may refer to a deterministic algorithm configured to map data of any arbitrary size to a bit array of a fixed size. Accordingly, being deterministic, a cryptographic hash function always results in a same hash value/output for a given same input or information set. Examples of the cryptographic hash function, which may be employed, may include, but are not limited to: the MD5 message-digest algorithm (or MD5, for short); and one or more variants of the Secure Hash Algorithm 2 (SHA-2) (e.g., SHA-256, which produces a 256-bit hash value/output).

In Step 208, source backup information is received from the asset source. In one embodiment of the invention, based on the information mode referencing a non-hash mode (described above), the source backup information may include a predefined collection of metadata descriptive of asset data from the asset(s) with which the protection policy (received in Step 204) is associated. In another embodiment of the invention, based on the information mode alternatively referencing a hash mode (described above), the source backup information may include a cryptographic hash of the aforementioned, predefined collection of metadata. Further, in either embodiment, the source backup information may pertain to a state of the asset data on the asset source just prior to the initiation of a backup operation targeting said asset data based on the instructions (provided to the asset source in Step 206).

In Step 210, a backup transferred notification is received from a backup target (described above) (see e.g., FIG. 1). In one embodiment of the invention, the backup transferred notification may inform the data protection manager that transfer of an asset backup (i.e., a copy of asset data of the asset(s) targeted for protection by way of the backup operation (initiated in Step 206)) from the asset source to the backup target is complete.

In Step 212, in response to the backup transferred notification (received in Step 210), an information request is submitted to the backup target. The information request may include the information mode (specified by way of the protection policy received in Step 204). Accordingly, in one embodiment of the invention, the information mode may reference a non-hash mode. In another embodiment of the invention, the information mode may alternatively reference a hash mode.

In Step 214, in response to the information request (submitted in Step 212), target backup information is received from the backup target. In one embodiment of the invention, based on the information mode referencing a non-hash mode (described above), the target backup information may include a predefined collection of metadata descriptive of asset backup data pertaining to the asset backup. In another embodiment of the invention, based on the information mode alternatively referencing a hash mode (described above), the target backup information may include a cryptographic hash of the aforementioned, predefined collection of metadata descriptive of asset backup data pertaining to the asset backup. Further, in either embodiment, the target backup information may associate with a state of the asset backup data, which had arrived at the backup target from the asset source.

In Step 216, a comparison is performed between the source backup information (received in Step 208) and the target backup information (received in Step 214). By way of the comparison, in Step 218, a determination is made as to whether the source backup information matches the target backup information. In one embodiment of the invention, if it is determined that the source backup information matches the target backup information, then the method proceeds to Step 220. On the other hand, in another embodiment of the invention, if it is alternatively determined that the target backup information mismatches the target backup information, then the method alternatively proceeds to Step 222.

In Step 220, following the determination (in Step 218) that the source backup information (received in Step 208) matches the target backup information (received in Step 214), instructions are provided to the backup target to commit the asset backup into storage. That is, in one embodiment of the invention, in having matching backup information, the asset backup that had arrived at the backup target from the asset source is found to be corruption-free and, accordingly, the asset backup may be committed.

In Step 222, following the alternative determination (in Step 218) that the source backup information (received in Step 208) mismatches the target backup information (received in Step 214), instructions are provided to the backup target to discard the asset backup. That is, in one embodiment of the invention, in having mismatching backup information, the asset backup that had arrived at the backup target from the asset source is found to be corrupt and, accordingly, the asset backup may be discarded.

Figure 3:
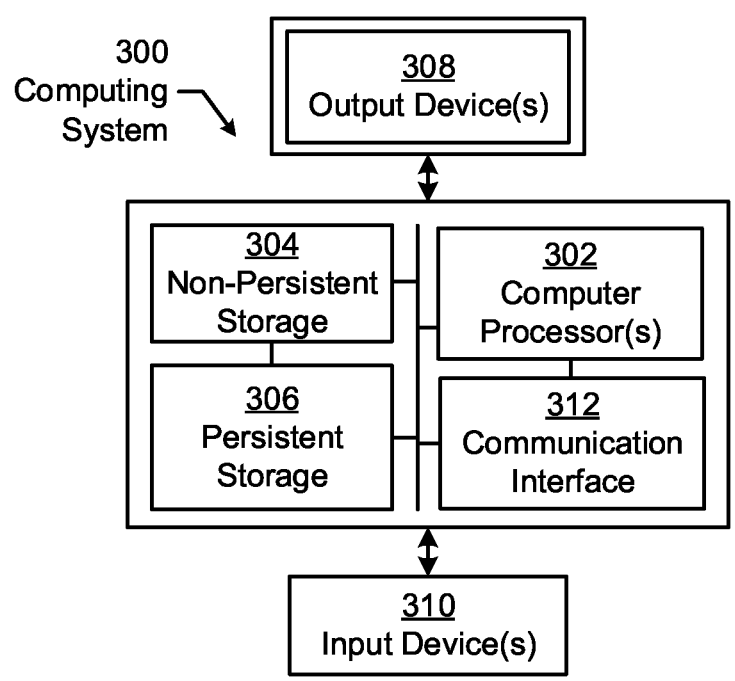
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for data protection, comprising:
providing, to an asset source, instructions for initiating a backup operation targeting asset data of an asset on the asset source;
receiving, from the asset source and in response to the instructions, source backup information indicating a state of the asset data prior to initiation of the backup operation by the asset source;
receiving, from a backup target, a backup transferred notification informing that the backup target has received a completed transfer of an asset backup representing a copy of the asset data from the asset source by way of the backup operation;
submitting, to the backup target and based on receiving the backup transferred notification, a target backup information request comprising an information mode;
receiving, from the backup target and in response to submission of the target backup information request, target backup information indicating a state of the asset backup;
making a determination that the asset backup, having arrived at the backup target, is corruption-free based on the state of the asset data matching the state of the asset backup; and
instructing, based on the determination, the backup target to commit the asset backup.

2. The method of claim 1, wherein the state of the asset data comprises asset metadata descriptive of the asset data, the asset metadata comprising a data type of the asset data, a creation timestamp generated for the asset data, a last modification timestamp generated for the asset data, ownership information associated with the asset data, a size of the asset data, and a checksum associated with the asset data.

3. The method of claim 1, wherein the source backup information comprises a cryptographic hash of asset metadata describing the asset data prior to the initiation of the backup operation.

4. The method of claim 1, wherein the information mode references a non-hash mode.

5. The method of claim 4, wherein based on the information mode referencing the non-hash mode, the target backup information comprises asset backup metadata describing asset backup data pertaining to the asset backup following a transfer of the asset backup from the asset source to the backup target.

6. The method of claim 1, wherein the information mode references a hash mode.

7. The method of claim 6, wherein based on the information mode referencing the hash mode, the target backup information comprises a cryptographic hash of asset backup metadata describing asset backup data pertaining to the asset backup following a transfer of the asset backup from the asset source to the backup target.

8. The method of claim 1, further comprising:
providing, to the asset source, second instructions for initiating a second backup operation targeting second asset data of a second asset on the asset source;
receiving, from the asset source and in response to the second instructions, second source backup information indicating a second state of the second asset data prior to initiation of the second backup operation by the asset source;
receiving, from the backup target and following a second arrival thereon of a second asset backup representing a copy of the second asset data, second target backup information indicating a second state of the second asset backup,
wherein the second arrival of the second asset backup follows a second completed transfer thereof from the asset source by way of the second backup operation;
making a second determination that the second asset backup, having arrived at the backup target, is corrupted based on the second state of the second asset data mismatching the second state of the second asset backup; and
instructing, based on the second determination, the backup target to discard the second asset backup.

9. A non-transitory computer readable medium (CRM) comprising computer readable program code, which when executed by a computer processor, enables the computer processor to perform a method for data protection, the method comprising:
providing, to an asset source, instructions for initiating a backup operation targeting asset data of an asset on the asset source;
receiving, from the asset source and in response to the instructions, source backup information indicating a state of the asset data prior to initiation of the backup operation by the asset source;
receiving, from a backup target, a backup transferred notification informing that the backup target has received a completed transfer of an asset backup representing a copy of the asset data from the asset source by way of the backup operation;
submitting, to the backup target and based on receiving the backup transferred notification, a target backup information request comprising an information mode;
receiving, from the backup target and in response to submission of the target backup information request, target backup information indicating a state of the asset backup;
making a determination that the asset backup, having arrived at the backup target, is corruption-free based on the state of the asset data matching the state of the asset backup; and
instructing, based on the determination, the backup target to commit the asset backup.

10. The non-transitory CRM of claim 9, wherein the state of the asset data comprises asset metadata descriptive of the asset data, the asset metadata comprising a data type of the asset data, a creation timestamp generated for the asset data, a last modification timestamp generated for the asset data, ownership information associated with the asset data, a size of the asset data, and a checksum associated with the asset data.

11. The non-transitory CRM of claim 9, wherein the source backup information comprises a cryptographic hash of asset metadata describing the asset data prior to the initiation of the backup operation.

12. The non-transitory CRM of claim 9, wherein the information mode references a non-hash mode.

13. The non-transitory CRM of claim 12, wherein based on the information mode referencing the non-hash mode, the target backup information comprises asset backup metadata describing asset backup data pertaining to the asset backup following a transfer of the asset backup from the asset source to the backup target.

14. The non-transitory CRM of claim 9, wherein the information mode references a hash mode.

15. The non-transitory CRM of claim 14, wherein based on the information mode referencing the hash mode, the target backup information comprises a cryptographic hash of asset backup metadata describing asset backup data pertaining to the asset backup following a transfer of the asset backup from the asset source to the backup target.

16. The non-transitory CRM of claim 9, the method further comprising:
providing, to the asset source, second instructions for initiating a second backup operation targeting second asset data of a second asset on the asset source;
receiving, from the asset source and in response to the second instructions, second source backup information indicating a second state of the second asset data prior to initiation of the second backup operation by the asset source;
receiving, from the backup target and following a second arrival thereon of a second asset backup representing a copy of the second asset data, second target backup information indicating a second state of the second asset backup,
wherein the second arrival of the second asset backup follows a second completed transfer thereof from the asset source by way of the second backup operation;
making a second determination that the second asset backup, having arrived at the backup target, is corrupted based on the second state of the second asset data mismatching the second state of the second asset backup; and
instructing, based on the second determination, the backup target to discard the second asset backup.

17. A system, comprising:
an asset source comprising an asset;
a backup target operatively connected to the asset source; and
a data protection manager operatively connected to the asset source and the backup target, and comprising a computer processor configured to perform a method for data protection, the method comprising:
providing, to the asset source, instructions for initiating a backup operation targeting asset data of the asset on the asset source;
receiving, from the asset source and in response to the instructions, source backup information indicating a state of the asset data prior to initiation of the backup operation by the asset source;
receiving, from the backup target, a backup transferred notification informing that the backup target has received a completed transfer of an asset backup representing a copy of the asset data from the asset source by way of the backup operation;
submitting, to the backup target and based on receiving the backup transferred notification, a target backup information request comprising an information mode;
receiving, from the backup target and in response to submission of the target backup information request, target backup information indicating a state of the asset backup;
making a determination that the asset backup, having arrived at the backup target, is corruption-free based on the state of the asset data matching the state of the asset backup; and
instructing, based on the determination, the backup target to commit the asset backup.

18. The system of claim 17, wherein the source backup information comprises a cryptographic hash of asset metadata describing the asset data prior to the initiation of the backup operation.

19. The system of claim 17, wherein the information mode references a non-hash mode, and wherein based on the information mode referencing the non-hash mode: the target backup information comprises asset backup metadata describing asset backup data pertaining to the asset backup following a transfer of the asset backup from the asset source to the backup target.

20. The system of claim 17, wherein the information mode references a hash mode, and wherein based on the information mode referencing the hash mode: the target backup information comprises a cryptographic hash of asset backup metadata describing asset backup data pertaining to the asset backup following a transfer of the asset backup from the asset source to the backup target.

* * * * *